US011835175B2

(12) United States Patent
Simek et al.

(10) Patent No.: US 11,835,175 B2
(45) Date of Patent: Dec. 5, 2023

(54) METHOD FOR A COMBINATION TOOL UTILIZED WITH AN ANCHORING SYSTEM

(71) Applicant: HILTI AKTIENGESELLSCHAFT, Schaan (LI)

(72) Inventors: Philipe Simek, Lantana, TX (US); Matteo Spampatti, Buchs (CH)

(73) Assignee: Hilti Aktiengesellschaft, Schaan (LI)

( * ) Notice: Subject to any disclaimer, the term of this patent is extended or adjusted under 35 U.S.C. 154(b) by 423 days.

(21) Appl. No.: 17/254,551

(22) PCT Filed: Jul. 11, 2019

(86) PCT No.: PCT/EP2019/068685
§ 371 (c)(1),
(2) Date: Dec. 21, 2020

(87) PCT Pub. No.: WO2020/016096
PCT Pub. Date: Jan. 23, 2020

(65) Prior Publication Data
US 2021/0270418 A1    Sep. 2, 2021

Related U.S. Application Data

(60) Provisional application No. 62/699,355, filed on Jul. 17, 2018.

(51) Int. Cl.
*B23P 11/00* (2006.01)
*F16M 13/02* (2006.01)
(Continued)

(52) U.S. Cl.
CPC ............ *F16M 13/027* (2013.01); *B23P 11/00* (2013.01); *E04B 1/4121* (2013.01); *E04B 5/40* (2013.01); *Y10T 29/49948* (2015.01)

(58) Field of Classification Search
CPC .................................................... B25B 27/143
See application file for complete search history.

(56) References Cited

U.S. PATENT DOCUMENTS 5,193,326 A * 3/1993 Sheahan ................. G01M 3/04
52/698
5,428,936 A * 7/1995 Roth ..................... E04B 1/4157
248/327

(Continued)

FOREIGN PATENT DOCUMENTS

EP    0 955 130 A2    11/1999
TW    M265168 U      5/2005

OTHER PUBLICATIONS

International Search Report in International Application No. PCT/EP2019/068685, dated Sep. 27, 2019.

*Primary Examiner* — Sarang Afzali
(74) *Attorney, Agent, or Firm* — Leydig, Voit & Mayer, Ltd.

(57) ABSTRACT

A method includes drilling a hole through a surface of a metal deck system via a drill component of a combination tool system. The method also includes disposing a portion of an anchoring system through the hole of the metal deck system. The anchoring system includes an anchor body supported by a housing sleeve. The method also includes removing the drill component of the combination tool system to expose a fastening component of the combination tool system. The method also includes fastening the anchoring system to the metal deck by pushing one or more fasteners through the housing sleeve and into the metal deck via the fastening component of the combination tool system.

9 Claims, 4 Drawing Sheets

(51) Int. Cl.
 *E04B 1/41* (2006.01)
 *E04B 5/40* (2006.01)

(56) References Cited

U.S. PATENT DOCUMENTS

| | | | |
|---|---|---|---|
| 6,240,697 B1 * | 6/2001 | Thompson | E04B 1/4121 |
| | | | 52/707 |
| 6,935,821 B2 | 8/2005 | Bodin et al. | |
| 7,093,400 B1 | 8/2006 | Thompson et al. | |
| 7,124,459 B1 * | 10/2006 | Croisdale | B23B 51/00 |
| | | | 7/158 |
| 7,494,310 B1 * | 2/2009 | Bodin | B25B 27/0007 |
| | | | 411/37 |
| 8,201,381 B2 * | 6/2012 | Heath | E04B 5/40 |
| | | | 52/704 |
| 8,267,628 B2 * | 9/2012 | Noce | E04B 5/40 |
| | | | 411/80.6 |
| 10,954,666 B2 * | 3/2021 | Somerfield | E04B 1/4114 |
| 2006/0048611 A1 * | 3/2006 | Berdin | F16B 43/001 |
| | | | 411/29 |
| 2006/0104735 A1 * | 5/2006 | Zeiler | B25F 5/021 |
| | | | 173/217 |
| 2015/0284967 A1 | 10/2015 | Kim | |
| 2015/0290722 A1 | 10/2015 | Foser | |
| 2015/0361668 A1 | 12/2015 | Stearns et al. | |

\* cited by examiner

US 11,835,175 B2

METHOD FOR A COMBINATION TOOL UTILIZED WITH AN ANCHORING SYSTEM

CROSS-REFERENCE TO RELATED APPLICATIONS

This patent application is the U.S. National Stage of International Patent Application No. PCT/EP2019/068685, filed Jul. 11, 2019, which claims the benefit of U.S. Patent Application No. 62/699,355, filed Jul. 17, 2018, which are each incorporated by reference.

BACKGROUND

The present disclosure relates generally to the field of anchoring systems, and more particularly to anchoring systems assembled within a deck. Specifically, the present embodiments are related to a combination tool that may be utilized to fasten anchoring systems to a metal deck.

In typical construction sites, deck construction (e.g., decking) is often utilized to build the floors and ceilings of multiple story buildings. In such buildings, anchoring systems may be installed to suspend various construction elements (e.g., pipes, sprinkler systems, HVAC components, trays and conduits, electrical elements, mechanical elements, nonstructural elements, etc.) from the ceiling. In certain situations, the anchoring systems may be positioned during the construction of the deck, before concrete is poured. For example, a wood form, a fluted, and/or a corrugated metal sheet of alternating peaks and valleys may be installed as a base. Further, various anchoring systems are positioned throughout the deck based on the desired function and position of the construction elements that the anchoring systems are configured to support within the building. After the anchoring systems are properly positioned and fastened to the base, concrete is poured and cured over the base, thereby securing and embedding the anchoring system. After formation of the deck (e.g., the floors and ceilings of the building), a male or female connection may be threaded into the anchoring system to securely suspend or fasten the construction element from the ceiling.

In certain situations, it may be difficult to efficiently install the anchoring systems in a desired location on the base, at least in part due to the number of tools and steps required for installation. For example, in some situations, a first tool may be utilized to create an opening within a corrugated metal sheet of alternating peaks and valleys. Further, a second tool may then be utilized to secure the anchoring system through and over the opening with one or more fasteners. Such installation methods may be time consuming when installing a plurality of anchoring systems to the metal deck. Accordingly, it may be beneficial to provide for systems and methods for a tool that improves efficiency when installing anchoring systems to metal decks.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In a first embodiment, a method is provided. The method includes drilling a hole through a surface of a metal deck system via a drill component of a combination tool system. The method also includes disposing a portion of an anchoring system through the hole of the metal deck system. The anchoring system includes an anchor body supported by a housing sleeve. The method also includes removing the drill component of the combination tool system to expose a fastening component of the combination tool system. The method also includes fastening the anchoring system to the metal deck by pushing one or more fasteners through the housing sleeve and into the metal deck via the fastening component of the combination tool system.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
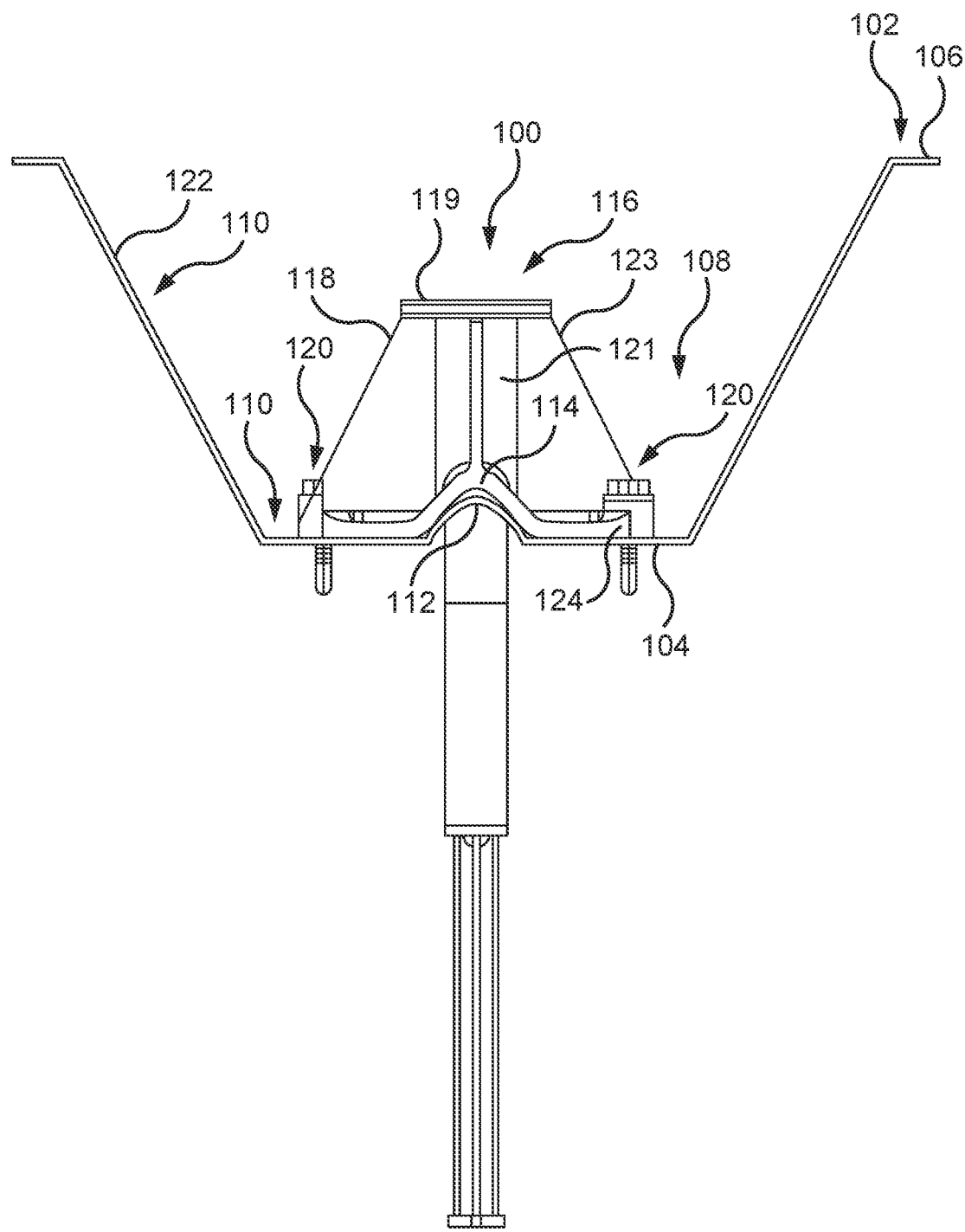
FIG. 1 is a perspective view of an embodiment of an anchoring system having an anchor body disposed within a housing, where the anchoring system is disposed on a metal deck.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Present embodiments are directed to systems and methods for a combination tool system that may be utilized to install anchoring systems into a metal deck. Typically, when an anchoring system is installed in a metal deck, a first drilling tool may be utilized to create a hole through the metal deck. After the anchoring system is disposed within the generated hole, a second fastening tool may be utilized to secure the anchoring system to the metal deck via one or more fasteners. After the anchoring system is properly secured to the metal deck, concrete may be poured and cured over the anchoring system, and a male/female threaded connection may be utilized to secure a construction element to the anchoring system.

In the present embodiments, the combination tool system may replace both the first drilling tool and the second fastening tool, thereby increasing the efficiency with which an operator can install a plurality of anchoring systems within the metal deck. In certain embodiments, the anchoring system may be a cast-in anchoring system that includes an anchor body supported by a housing sleeve. The housing sleeve may secured to the metal deck via one or more fasteners. In certain embodiments, the anchoring system may include one or more self-tapping screws. The self-tapping screws may be pre-installed (e.g., partially threaded) into the housing sleeve, and may be utilized to secure the anchoring system to the metal deck. Features and components of an example of an anchoring system that may be utilized with the combination tools system described in the present embodiments may be found in U.S. Provisional Patent Application 62/699,298, filed on Jul. 17, 2018, which is hereby incorporated by reference in full.

In certain embodiments, the combination tool system may include a drill component, a sleeve component, and a fastening component. During installation, the drill component of the combination tool may be utilized to drill a hole within a metal deck. Next, a portion of the anchoring system may be disposed within the generated hole. In certain embodiments, the sleeve component and the drill component may be disengaged from the combination tool to reveal the fastening component. In certain embodiments, the fastening component of the combination tool system may be utilized to secure the anchoring system to the metal deck via the fasteners (e.g., self-tapping screws). In this manner, the combination tool system may include components that assist in various steps of the installation process, thereby reducing the need to switch between multiple tools. Accordingly, the combination tool may help improve the efficiency of the installation process when installing a plurality of anchoring systems on the metal deck, prior to the concrete being poured and cured.

With the foregoing in mind, FIG. 1 is a perspective view of an embodiment of the anchoring system 100 that may be pre-installed and installed on a metal deck 102 with a combination tool system 103. In certain embodiments, the pre-installation process may refer to a period of time during construction during which the anchoring system 100 is positioned on the deck and before concrete is poured. In certain embodiments, the metal deck 102 may be a corrugated sheet metal having alternating valley (e.g., a valley 104) and peak (e.g., a peak 106) regions, and may be utilized in horizontal ceiling applications. The metal deck 102 may be cast in concrete on-site, such that the corrugated sheet metal remains on the lower side of the ceiling. The gaps between each valley 104 and peak 106 create one or more flutes 108 that run the length of the metal deck 102. In certain embodiments, the flutes 108 have features that protrude from and/or indent into the inner surface 110. For example, the features may be ridges, valleys, depressions, protrusions, grooves, embossments, cavities, contours, etc.

In certain embodiments, the anchoring system 100 includes an anchor body 116 supported by a housing sleeve 118. Particularly, the anchor body 116 may include a head 119 and a hollow chamber that is configured to receive a male (or female) threaded connection post-installation of the anchoring system 100. In certain embodiments, the housing sleeve 118 includes various components that provide support for the hollow chamber of the anchor body 116. For example, the housing sleeve 118 may include a cylindrical space 121 configured to receive the hollow chamber of the anchor body 116. Further, the housing sleeve 118 may include one or more wings 123 that extend from a foundation 124 to below the head 119 of the anchor body 116. In certain embodiments, the head 119 of the anchor body 116 may be flush with the top of the housing sleeve 118. The wings 123 may be configured to provide structural support to the anchor body 116 during transportation as well as during the pre-installation process. Specifically, during the pre-installation process, when the anchoring system 100 is fastened to the metal deck 102, the anchoring system 100 may be configured to withstand one or more impacts that help secure the housing sleeve 118 to the metal deck 102.

In certain embodiments, during the pre-installation process (e.g., before the concrete is poured), the anchoring system 100 is positioned at a desired location on the deck 102. As shown in the illustrated embodiments, embodiments of the anchoring system 100 allow the anchoring system 100 to be disposed directly on top of certain features on the metal deck 102. For example, anchoring system 100 may be configured to sit on a ridge 112 within the valley 104 of the metal deck 102. The ridge 112 may run the length of the flute 108, and may protrude away from an inner surface 110 of the valley 104. In certain embodiments, the housing sleeve 118 may include an arch 114 that is configured to adapt to the shape of the ridge 112. In particular, the arch 114 of the housing sleeve 118 allows the anchoring system 100 to be positioned at any desired location on the inner surface 110—including on top of the ridge 112. While the anchoring system 100 may be positioned on the ridge 112 if desired, the anchoring system 100 may additionally be positioned on any flat surface, such as the spaces between the ridge 112 and the angled region 122 and/or on the angled region 122. In this manner, the arch 114 may provide additional flexibility for the anchoring system 100 by allowing for a greater range of use on the metal deck 102.

Figure 2:
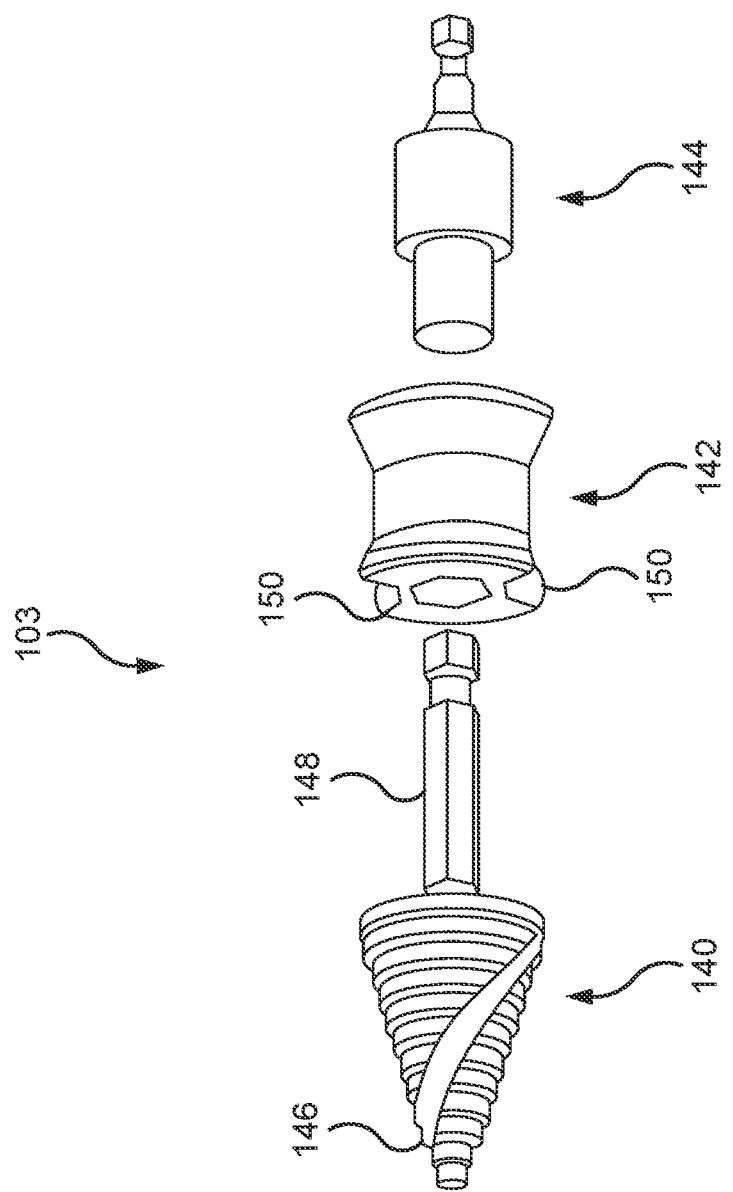
FIG. 2 is an expanded view of an embodiment of a combination tool system utilized to install the anchoring system of FIG. 1 into the metal deck, where the combination tool system includes a drill component, a sleeve component, and a fastening component.
Figure 3:
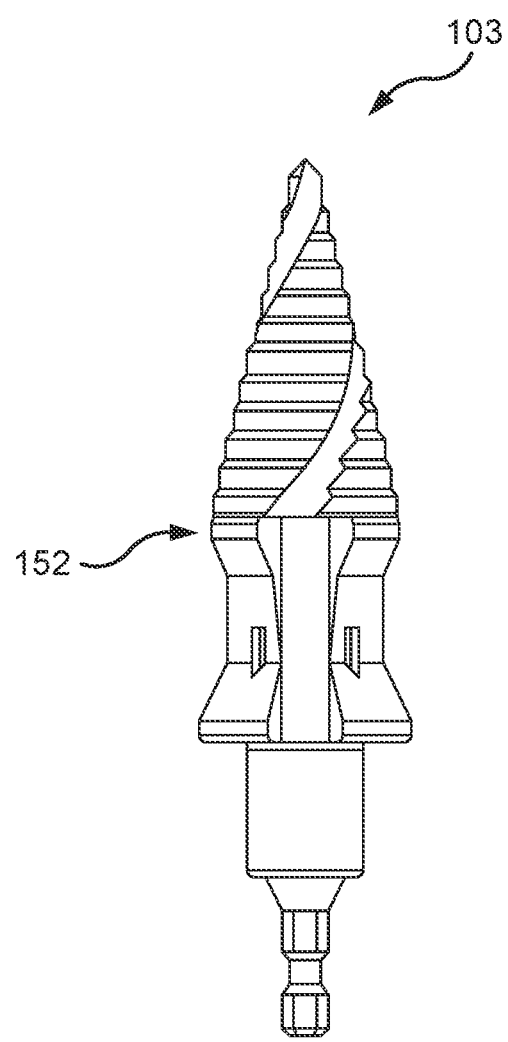
FIG. 3 is a perspective view of an embodiment of the combination tool system of FIG. 2.

Once an installation location for the anchoring system 100 is decided on the metal deck 102, the combination tool system 103 (as illustrated in FIGS. 2-3) may be utilized to drill a hole through the metal deck 102. In certain embodiments, the hole may be sized to fit a portion of the anchoring system 100 through the metal deck 102, while the anchor body of the anchoring system 100 remains above the metal deck 102. After the anchoring system 100 is disposed through the hole on the metal deck 102, the combination tool system 103 (as illustrated in FIGS. 2-3) may be utilized to secure the housing sleeve 118 to the metal deck 102. Specifically, the housing sleeve 118 may include one or more self-tapping screws 120. In certain embodiments, the combination tool system 103 may be configured to secure the self-tapping screws 120 to the metal deck 102. In other embodiments, the combination tool system 103 may be configured to install any type of fastener that secures the housing sleeve 118 of the anchoring system 100 to the metal deck 102.

Accordingly, the combination tool system 103 may be configured to install the anchoring system 100 during a pre-installation phase, such as during the time the anchoring system 100 is secured to the metal deck 102 prior to when concrete is poured and cured. In particular, the combination tool system 103 may include components that assist in various steps of the installation process, thereby reducing the need to switch between multiple tools.

FIG. 2 is an expanded view of an embodiment of a combination tool system 103 utilized to install the anchoring system 100 of FIG. 1 into the metal deck 102, where the combination tool system 103 includes a drill component 140, a sleeve component 142, and a fastening component 144. In particular, the drill component 140 may be utilized to drill a hole in the metal deck 102, and the fastening component 144 may be configured to install the self-tapping screws 120 to the metal deck 102. In this manner, a single tool (e.g., the combination tool system 103) may be configured to operate for multiple functions, thereby allowing an operator to cycle between the different components of the combination tool system 103 during the installation of a plurality of anchoring systems 100. In certain embodiments, the sleeve component 142 (e.g., rubber grip) may allow the combination tool system 103 to be held together as one unit, and may be ergonomically designed to make handling easier.

In certain embodiments, the drill component 140 of the combination tool system 103 may be a step bit component. In certain embodiments, the drill component 140 may be a hole saw, an annular cutter, a hole cutter, or any type of tool that may be utilized to create a hole. For example, in the illustrated embodiments, the drill component 140 may be any type of bit that is configured for a creating a hole or opening within a metal material (e.g., the metal deck 102). In certain embodiments, the drill component 140 may include at least 2 sizes. In certain embodiments, the drill component 140 may include a spiral groove 146 and a long shank 148. In certain embodiments, the shank 148 may be ⁵⁄₁₆" hex×2". In certain embodiments, the drill component 140 may include a straight groove instead of the spiral groove, which may help in removing the discarded drilling waste from the drilling operation. In certain embodiments, the material of the drill component 140 may be M2 HSS without a titanium coating. In certain embodiments, the material of the drill component 140 may be any type of material suitable for drilling through the metal deck 102, and may include any type of coating. In certain embodiments, the drill component 140 may be a 12 step (³⁄₁₆" to ⅞") or a 12 step (⁷⁄₁₆" to 1⅛").

In certain embodiments, the combination tool system 103 includes the fastening component 144. In certain embodiments, the fastening component 144 may be an impact drill, a screw fastening drill, a hand chuck, or any tool that may be typically used to secure one or more fasteners to a metal deck. In the illustrated embodiment, the fastening component 144 is an impact drill that is configured to fasten one or more fasteners (e.g., screws, nails, self-tapping screws, etc.) through the housing sleeve 118 of the anchoring system 100 and into the metal deck 102. For example, the fastening component 144 may include a ⁵⁄₁₆" hex that is utilized to push the one or more fasteners (e.g., self-tapping screws) through the housing sleeve 118 and into the metal deck 102. However, in other embodiments, the fastening component 144 may be any type of tool that is configured to secure various types of fasteners into a metal deck. In certain embodiments, the fastening component 144 may include a quick release sleeve to mechanically interlock with the drill component 140. This ensures that the drill component 140 does not inadvertently release from the fastening component 144 during the drilling operation.

In certain embodiments, the combination tool system includes a sleeve component 142, which may be a grip made of various materials (e.g., rubber, plastic, etc.). The sleeve component 142 may allow for easier handling of combination tool system 103. In certain embodiment, the sleeve component 142 may include a material that regulates or insulates against high temperatures. For example, after utilizing the combination tool system 103 to drill a hole in the metal deck, the combination tool system 103 may be warm or hot to handle. In certain embodiments, the sleeve component may include slots for placement of the drill component 140 when not in use.

FIG. 3 is a perspective view of an embodiment of the combination tool system 103 of FIG. 2. In certain embodiments, the drill component 140 and the fastening component 144 may be attached via an interlocking mechanism 152. Once the drill component 140 of the combination tool system 103 is utilized to drill the hole in the metal deck 102, the drill component 140 may be removed or disengaged from the other components of the combination tool system 103 via the interlocking mechanism. In certain embodiments, both the drill component 140 and the sleeve component 142 are removed to expose the fastening component 144. In certain embodiments, the sleeve component 142 may include one or more slots 150 that may secure the removed drill component 140 until the installer reassembles the combination tool system 103. In certain embodiments, these slots in the grip are wide enough so that it can be removably accepted by a clip within a power tool. In this manner, the slots 150 may be configured to secure the drill component to the power tool, thereby reducing the possibility of an installer accidentally misplacing the drill component 140.

Figure 4:
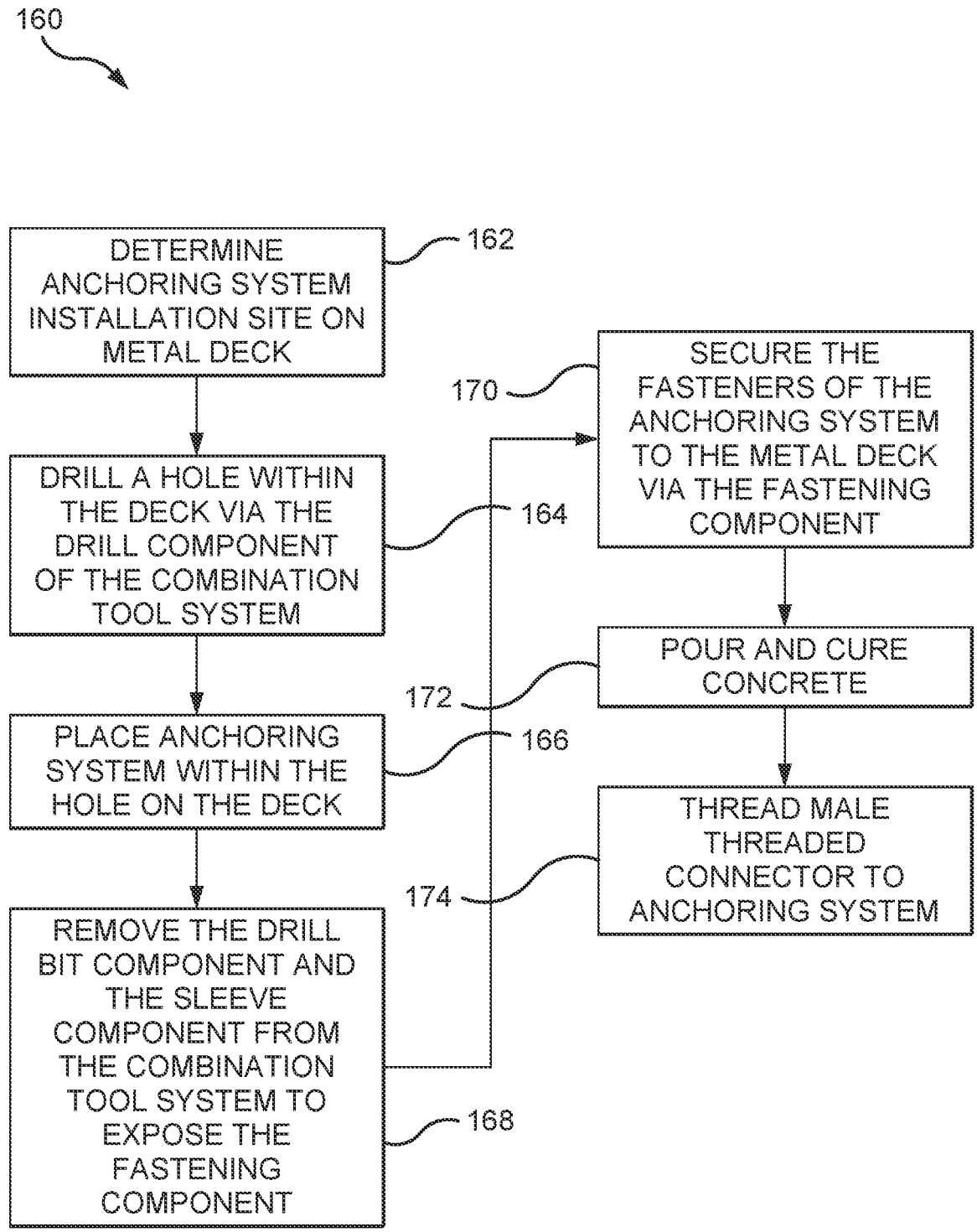
FIG. 4 is an embodiment of a method of installing the anchoring system within the metal deck of FIG. 1 with the combination tool system of FIG. 3.

FIG. 4 is an embodiment of a method 160 of installing the anchoring system 100 within the metal deck 102 of FIG. 1 with the combination tool system 103 of FIG. 3. In certain embodiments, the method 160 includes determining an installation site on the metal deck 102 for the anchoring system 100 (block 162). In particular, the location of the installation site may be determined by the desired location of the installed construction element (e.g., pipes, sprinkler systems, HVAC components, trays and conduits, electrical elements, mechanical elements, nonstructural elements, etc.) from the ceiling. It should be noted that the anchoring system 100 may be disposed anywhere on the metal deck 102—such as on a ridge or along an inclined of the metal deck 102. In particular, the drill component 140 of the combination tool system 103 may enable easier drilling of the holes through the metal deck 103 on these particular locations due to the shape of function of the tool.

In certain embodiments, the method 160 includes drilling one or more holes (e.g., through holes, through penetrations, etc.) within the deck (block 164) at the desired location. For example, in certain embodiments, a combination tool system 103 may be configured to drill a hole within the metal deck 102 that is sized to fit the cylindrical body 121 (and/or the tube 140, and/or the plug 144). Further, after the hole is formed, the method 160 includes inserting a portion of the anchoring system 100 into the formed hole (block 166). In particular, after insertion of the anchoring system 100 through the hole, the anchor body of the anchoring system 100 may be disposed above the metal deck 102.

In certain embodiments, after the anchoring system 100 is disposed into the hole, the anchoring system 100 may need to be secured to the metal deck 102 at the desired location so that the anchoring system 100 does not dislodge or move prior to the pouring and curing of concrete. In particular, the method 160 may include converting the combination tool system 103 to expose the fastening component 144. Specifically, the method 160 may include removing the drill component 140 and the sleeve component 142 to expose the fastening component 144 (block 168). The method 160 also includes securing the housing sleeve of the anchoring system 100 to the metal deck 102 with the fastening component 144 and one or more fasteners (block 170). In certain embodiments, the fastening component 144 may be configured to install one or more self-tapping screws 120 to secure the housing sleeve 118. In this manner, the components of the combination tool system 103 may be utilized during multiple installation phases of the anchoring system 100.

In certain embodiments, the method 100 includes pouring and curing the concrete onto the anchoring systems 100 installed into the metal deck 102 (block 172). Further, the method includes coupling a male/female threaded connection to the anchoring system 199 (block 174). In this manner, the anchoring system 100 may be utilized as a cast-in anchor system (e.g., the anchoring system 100 or anchor system) that is pre-installed to the metal deck 102 for construction element (pipes, sprinkler systems, HVAC components, trays and conduits, electrical elements, mechanical elements, non-structural elements, etc.) utilized for various electrical, mechanical, plumbing, or other applications. In particular, the anchoring systems 100 may be installed with one tool, rather than multiple tools, thereby increasing the efficiency with which a plurality of anchoring systems 100 are installed onto the metal deck 102.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method of fastening an anchoring system, the method comprising:
   providing a combination tool system, wherein the combination tool system comprises a drill component, a sleeve component, and a fastening component;
   drilling a hole through a surface of a metal deck via the drill component of the combination tool system;
   disposing a portion of the anchoring system through the hole, wherein the anchoring system comprises an anchor body supported by a housing sleeve;
   removing both the drill component and the sleeve component of the combination tool system to expose the fastening component of the combination tool system; and
   fastening the anchoring system to the metal deck by pushing one or more fasteners through the housing sleeve and into the metal deck at one or more distances from the hole drilled through the surface of the metal deck via the drill component via the fastening component of the combination tool system.

2. The method of claim 1, wherein disposing the portion of the anchoring system through the hole comprises disposing the anchor body above a valley of the metal deck.

3. The method of claim 1, further comprising attaching the removed drill component to a slot within the sleeve component.

4. The method of claim 1, wherein removing the drill component of the combination tool system comprises disengaging an interlocking mechanism between the drill component and the fastening component.

5. The method of claim 1, wherein the one or more fasteners are self-tapping screws.

6. The method of claim 1, further comprising attaching or reattaching the drill component of the combination tool system to a power tool.

7. The method of claim 1, further comprising pouring and curing concrete over the anchoring system installed within the metal deck.

8. The method of claim 1, further comprising coupling a construction element to the anchor body via a male threaded connection.

9. The method of claim 8, wherein the construction element comprises pipes, sprinkler systems, HVAC components, conduits, electrical elements, plumbing elements, mechanical elements, or any combination thereof.

* * * * *